(12) United States Patent
Harslund et al.

(10) Patent No.: US 8,801,271 B2
(45) Date of Patent: Aug. 12, 2014

(54) CALIBRATION APPARATUS

(75) Inventors: Jan Haakon Harslund, Slangerup (DK); Folke Galsgaard, Nivå (DK)

(73) Assignee: Ametek Denmark A/S, Allerod (DK)

( * ) Notice: Subject to any disclaimer, the term of this patent is extended or adjusted under 35 U.S.C. 154(b) by 0 days.

(21) Appl. No.: 12/258,845

(22) Filed: Oct. 27, 2008

(65) Prior Publication Data
US 2010/0103975 A1 Apr. 29, 2010

(51) Int. Cl.
*G01K 15/00* (2006.01)
*G01K 7/00* (2006.01)
*G01K 3/00* (2006.01)
*G01K 1/00* (2006.01)

(52) U.S. Cl.
USPC ................ 374/1; 374/208; 374/112; 374/166

(58) Field of Classification Search
USPC .................................. 374/1, 3, 208, 166, 112
See application file for complete search history.

(56) References Cited

U.S. PATENT DOCUMENTS

| | | | |
|---|---|---|---|
| 4,901,257 A * | 2/1990 | Chang et al. ................... | 702/99 |
| 6,007,239 A | 12/1999 | Nickol | |
| 6,193,411 B1 * | 2/2001 | Chen ................................ | 374/2 |
| 2007/0206653 A1 * | 9/2007 | Nakano et al. ................... | 374/1 |
| 2007/0268953 A1 | 11/2007 | Price | |
| 2007/0289314 A1 | 12/2007 | Liebmann et al. | |
| 2007/0291814 A1 | 12/2007 | Hirst | |
| 2009/0003406 A1 * | 1/2009 | Sjogren et al. ................... | 374/1 |
| 2009/0121033 A1 * | 5/2009 | Sjogren et al. ................ | 237/2 A |

FOREIGN PATENT DOCUMENTS

| | | |
|---|---|---|
| CN | 101078656 | 11/2007 |
| EP | 1 811 276 | 6/2006 |
| GB | 2 435 691 A | 9/2007 |
| NL | 8500802 | 10/1986 |
| WO | WO 99/04231 | 1/1999 |
| WO | WO 00 40939 | 7/2000 |
| WO | WO 2008-087038 | 7/2008 |

OTHER PUBLICATIONS

International Search Report dated Oct. 10, 2008 in corresponding International Application No. PCT/DK2009/050268.

* cited by examiner

*Primary Examiner* — Mirellys Jagan
(74) *Attorney, Agent, or Firm* — Finnegan Henderson Farabow Garrett & Dunner LLP

(57) ABSTRACT

A calibration apparatus for temperature probes comprising an elongate calibration chamber (1) with an opening (2) for receiving an insert (3) that has passages (4) for receiving temperature probes (6), and wherein the chamber (1) has several heat energy elements (-11) that are controlled by temperature probes (12-14). In the insert as such one or more external probes (7) are provided, each of which has one or more temperature sensors to the effect that at least two sensors (19, 20 or 15, 17) are provided at respective dissimilar distances to an end of the insert (3). The latter sensors are connected to electronic regulation (20, 23) and measurement units (21, 24) for regulating the supply of power to the heat energy elements.

11 Claims, 5 Drawing Sheets

CALIBRATION APPARATUS

BACKGROUND OF THE INVENTION

The invention relates to a calibration apparatus for temperature probes comprising a calibration chamber with an opening for receiving an insert having passages for receiving temperature probes, where the chamber has several heat energy elements, and wherein the apparatus has temperature probes and electric circuits for controlling the heat energy elements.

Such calibration apparatus is known eg from WO 99/04231. Such apparatuses are used for calibrating temperature probes with an accuracy that may be down to 0.01°. Due to the high degree of accuracy there is a number of sources of error, some of which have already been remedied by the prior art. One of the major problems originates in heat being conveyed away from the calibration chamber near the opening. One the one hand due to it not being possible to arrange any heating element in the opening where the insert is to be introduced and, on the other, due to the temperature probe(s) that are arranged in the passages entailing an uncontrollable discharge of heat (or cold), also in case eg the heating elements in the calibration chamber can be controlled for achieving a very precise temperature. The thermal energy from the heating elements is to propagate through the insert, where temperature probes are disposed in some of the passages, but maybe not in all of them; and wherein each of the temperature probes discharges a certain amount of thermal energy to the effect that, precisely where the temperature probe to be calibrated is disposed, the temperature is not at all the same as the temperature of the heating elements. The use of several heat energy elements is a known method of reducing the undesired and unknown temperature gradients, but so far it has only been possible to control the temperature immediately around the heat energy elements.

The object of the invention is to provide a calibration apparatus whereby improved accuracy can be obtained in the calibration of a temperature probe than has been possible so far.

SUMMARY OF THE INVENTION

This object is achieved in that the temperature probes comprise at least two external temperature sensors that are disposed at dissimilar distances from an opening in the insert.

Thereby a temperature gradient immediately proximate to the temperature probe(s) disposed in the passages of the insert can be measured.

One single sensor can be arranged in each temperature probe, and therefore there has to be a passage in the insert for each of the temperature probes.

By another embodiment two temperature sensors can be provided in an external probe, where the sensors are arranged at a certain mutual distance in the longitudinal direction of the probe. By this embodiment the insert comprises a relatively long passage for receiving such external temperature probe.

By a preferred embodiment two series-connected sensors in an external temperature probe can also be provided, and they are connected to the electric control circuits for controlling the heat energy elements.

Three or more sensors may also be provided in one single or more external temperature probes, whereby it is possible to control the temperature very accurately according to any need.

Usually, it is preferred to use separate external temperature probes that can be introduced into a passage in the insert, but it will be understood that the invention also covers the option that the calibration chamber is coherent with one or more temperature probes that can extend into a passage in the insert.

The heat energy elements can be electric heating elements and/or cooling elements, and eg Peltier-elements can be used that can be switched by purely electric means between being heating and cooling elements.

The invention also enables completely new options for electronic control and electronic storage of the course of the temperature in the insert, depending on the heat discharge from the calibration chamber.

BRIEF DESCRIPTION OF THE DRAWINGS

The invention will now be explained in further detail with reference to the following description of an embodiment, reference being made to the drawings, wherein

FIG. 4 shows a principle sketch for controlling the calibration apparatus according to the invention, while

DETAILED DESCRIPTION OF THE INVENTION

Figure 1:
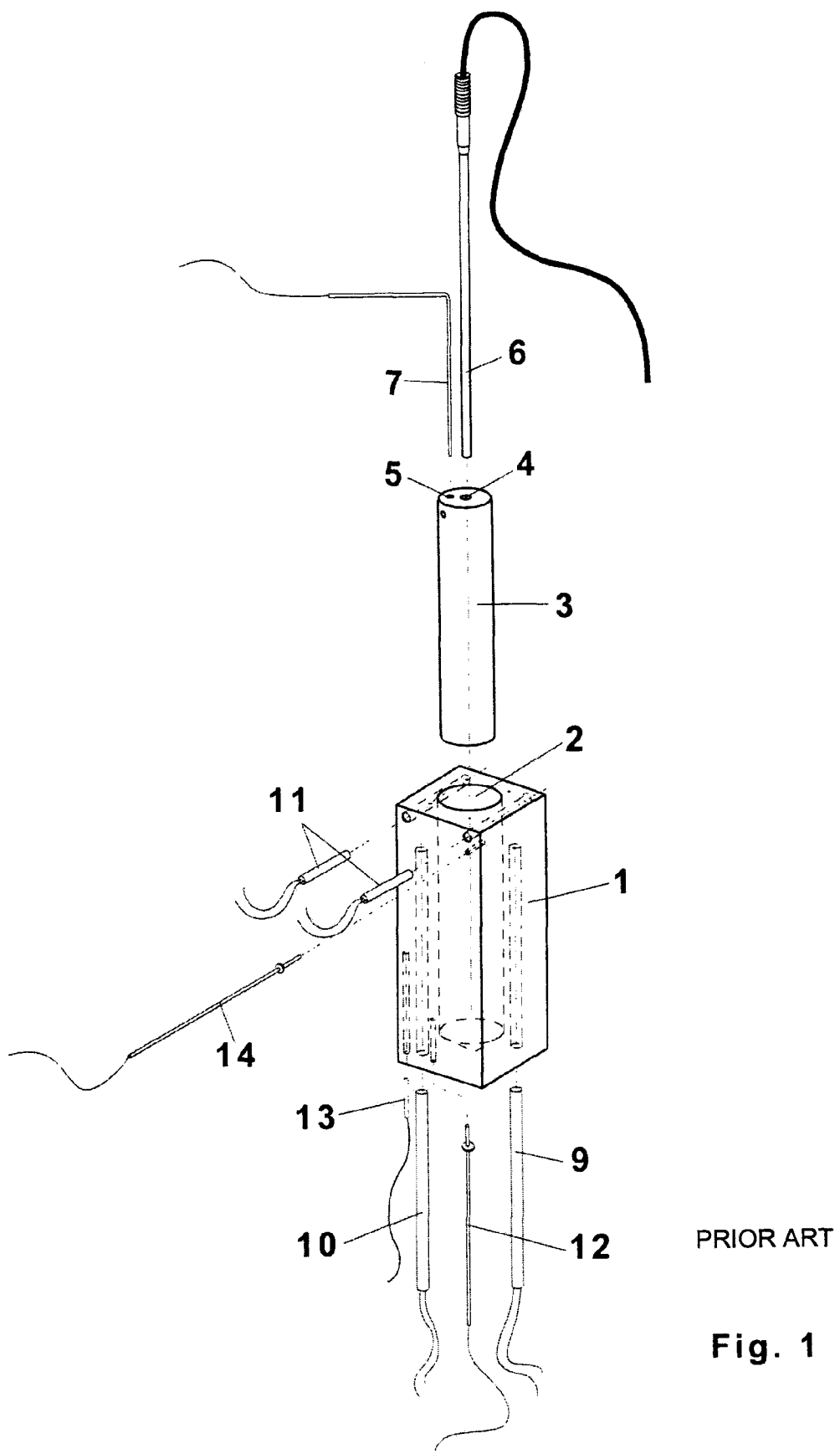
FIG. 1 shows an exploded, perspective view of a known heating chamber.

FIG. 1 shows a calibration chamber 1 which is typically an elongate, upright block with an opening 2 at the top for receiving an insert 3 with a close fit. The invention is not limited to precisely that configuration of the calibration apparatus, but the example will be applied in the following.

The insert 3 also has openings 4 and 5 for receiving a temperature probe 6 and a temperature probe 7, respectively.

Also, the calibration chamber or block 1 has a number of holes for receiving electric heating elements 9-11 and various temperature probes 12-14 that are connected to electric control circuits that regulate the power supply to the heating elements. It is noted that cooling elements may also be provided for calibrating temperature probes at low temperatures.

Typically several types of inserts are provided with a larger or smaller number of holes of varying size for receiving several sizes of probes 6, optionally several probes at a time. This means that the discharge of thermal energy from the calibration chamber depends very strongly on the type of insert that has been mounted in the calibration chamber, and which and how many probes 6 that are introduced into the insert 3. In practice, this will make it difficult to regulate the temperature very accurately at the temperature probe 6.

By the prior art, the probe 13 is used for determining the temperature of the calibration chamber, while probes 12 and 14 are used to regulate the difference in temperature between top and bottom of the calibration chamber. In attempts to improve the measurement of accuracy and the regulation speed, it is also known to dispose a temperature probe 7 in the insert 3 such that an input from that probe is able to reduce the temperature errors that occur by use of only the temperature probes 12-14.

Figure 2:
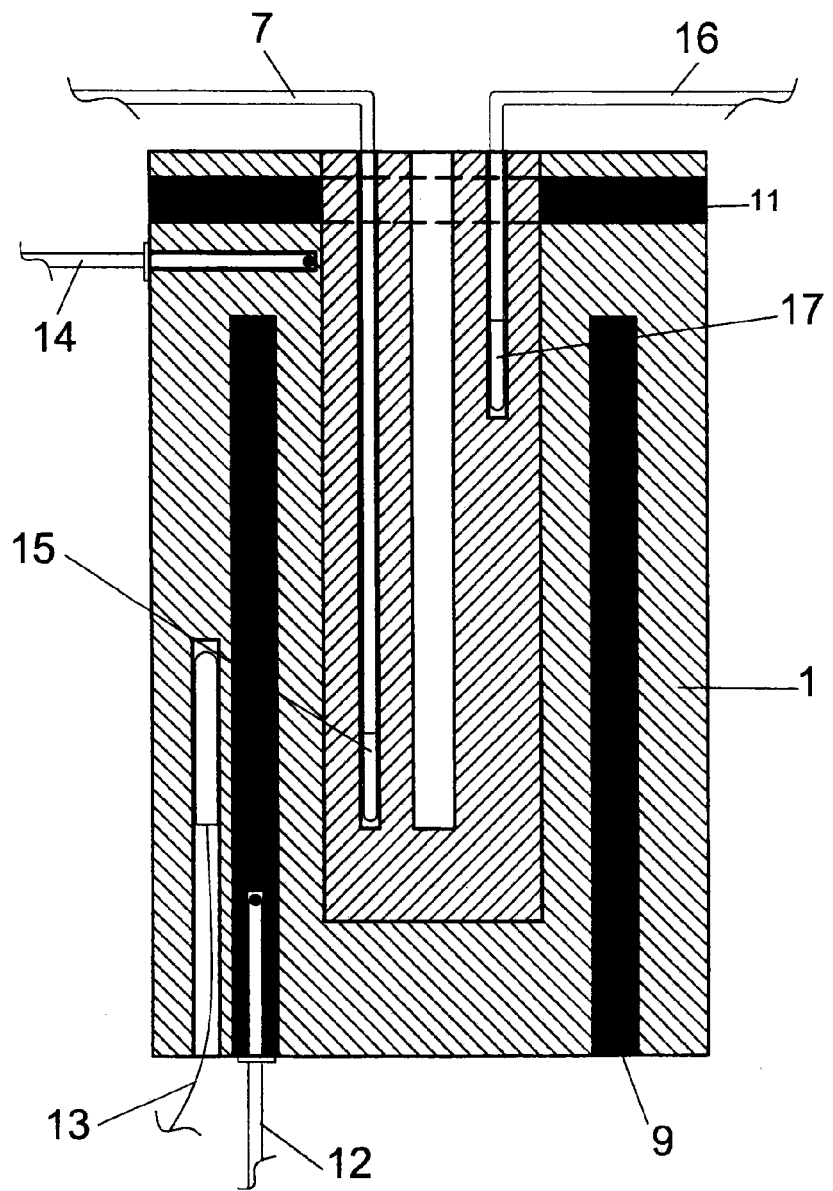
FIG. 2 shows a sectional view through such heating chamber, but changed to show an embodiment of the invention.

FIG. 2 shows a section through a calibration apparatus according to the invention, where the parts that were already explained in the context of FIG. 1 is shown by same reference numerals. According to the invention, the insert as such comprises at least two separate temperature sensors that are arranged at dissimilar distances from the heating elements 11 at the top of the heating chamber 1. By the embodiment shown in FIG. 2, the one sensor is the sensor 15 in the probe 7, while another external probe 16 is provided that has a sensor 17. As explained above, it is difficult to control the temperature at the top of the calibration chamber due to the varying thermal load from the top of the insert 3 to the effect that, throughout, the insert has the same temperature. By being now, in accordance with the invention, able to measure the difference between the sensors 15 and 17, it is possible to obtain improved regulation for maintaining a predetermined temperature, but also an improved regulation for achieving the temperature, the development in the difference in temperature between sensors 15 and 17 being usable for providing a far more efficient regulation of the heating elements, in particular the heating elements at the top 11.

Figure 3:
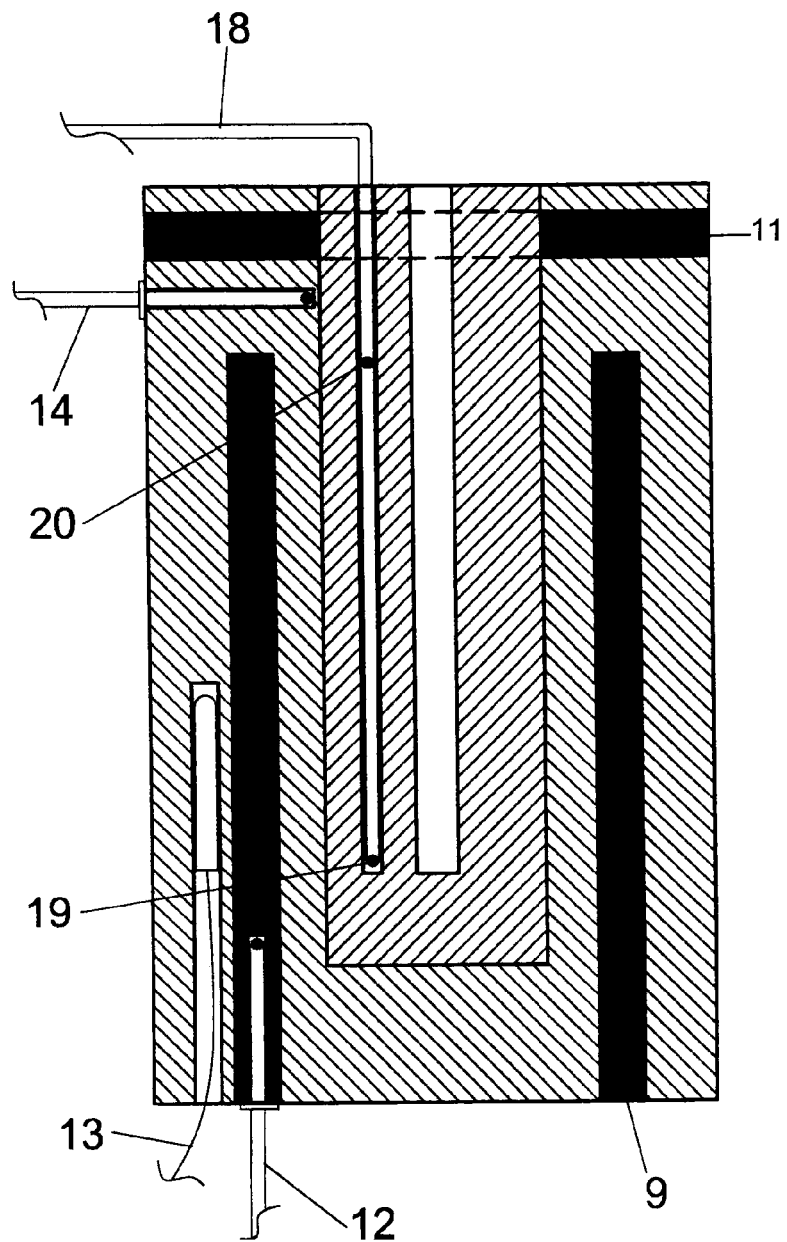
FIG. 3 shows a sectional view through another embodiment of the invention.

FIG. 3 shows an alternative embodiment of the invention, an external probe 18 being used here that accommodates two sensors 19, 20 that are, according to the invention, also disposed at dissimilar distances from the heating elements at the top of the calibration chamber. By a preferred embodiment, the sensors 19 and 20 are connected in series to the effect that the difference of potential or the electric resistance is taken to express the difference in temperature between the sensors. Thus, it will be understood that many variations are possible when it comes to disposing external probes in accordance with the invention in the insert. Likewise, it will be understood that it is not necessary that the external probe(s) is/are introduced from the exterior into a passage in the insert. It is also conceivable that an external one may extend upwards from the bottom of the calibration chamber and that the insert has a passage for receiving such probe.

Figure 4:
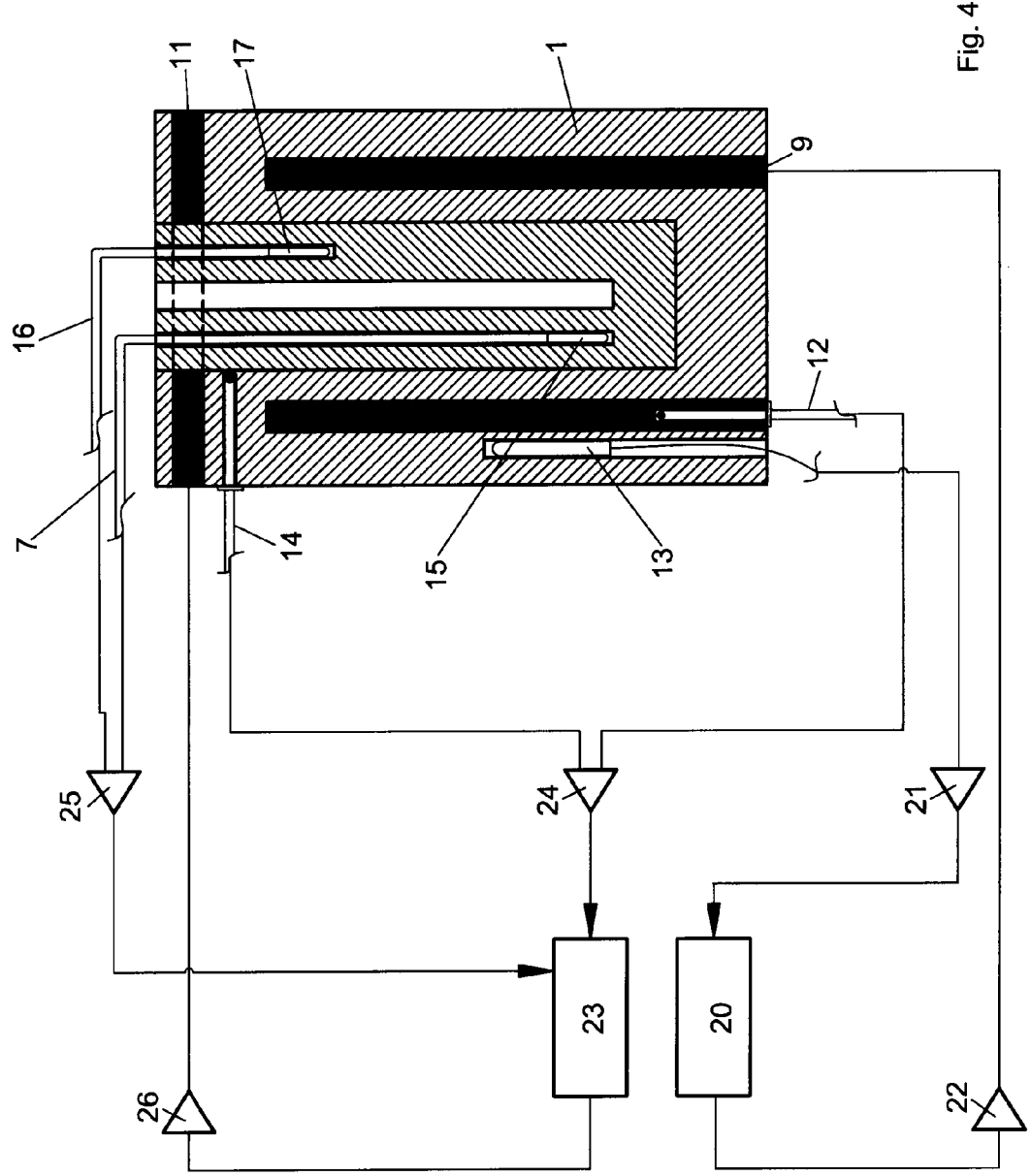

FIG. 4 shows an example of a circuit for controlling the calibration apparatus according to the invention.

In a known manner, a first regulator unit 20 controls the basic energy supply to the calibration chamber, the probe 13 emitting a signal via a measurement unit 21. A power regulation unit 22 regulates the power supply to the heating element 9.

Moreover, another regulator unit 23 is provided which—also in a manner known per se—regulates the power supply to the heating element 11. This is accomplished by the difference in temperature between the probes 13 and 14 being measured by means of a measurement unit 24, following which the regulator unit 23 controls a power regulation unit 26.

According to the invention, both the temperature sensor 15 and the temperature sensor 17 are provided, and the difference in temperatures is found by means of the measurement unit 25. Thereby it is possible to adjust the power supply to the heating element 11 at different temperatures and different loads to the effect that the temperature gradient in the insert 3 becomes independent of the thermal load from temperature probe 6. For instance, the regulator units 20 and 23 may be configured for storing tables showing how the fastest heating to an exact temperature is accomplished in the context of various thermal loads deriving from probe 6 in the insert 3. That information may also be used to insert a temperature offset between temperature probes 12 and 14.

Figure 5:
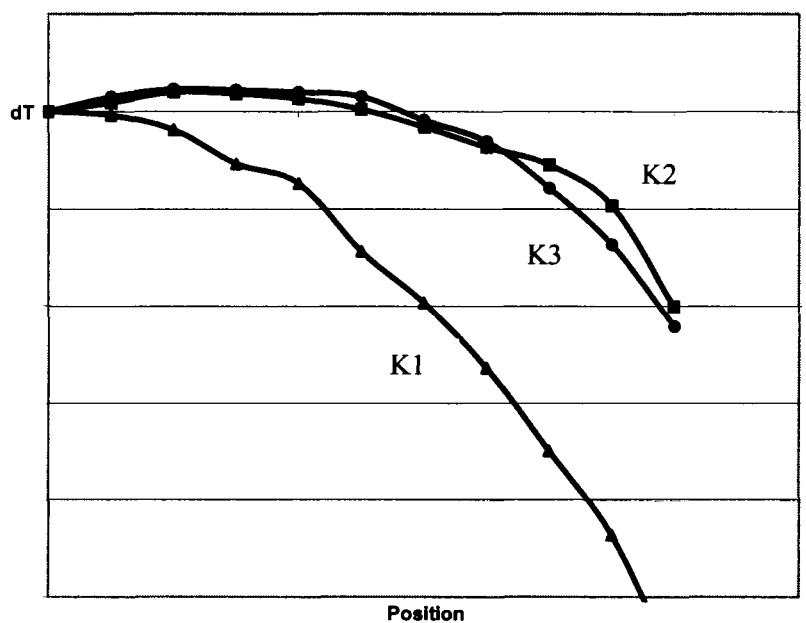
FIG. 5 shows curves for illustrating the effect of the invention.

FIG. 5 shows a number of curves that illustrate the effect of the invention.

The temperature T represents the ideal temperature that should preferably prevail throughout the entire insert. However, the curve K1 shows that this is not the case in practice when the insert is subject to thermal load by a temperature probe. The temperature drops largely evenly from the bottom of the insert and towards its top. Curves K2 and K3 show the temperature distribution in the insert by a calibration apparatus according to the invention. K2 shows the temperature distribution without thermal load, e.g. from the temperature probe that is to be calibrated, while K3 shows how the heat is distributed in the longitudinal direction of the insert when the insert is loaded by a temperature probe.

The invention claimed is:

1. A calibration apparatus for calibrating temperature probes comprising a calibration block elongated in a longitudinal direction and having an opening at one end for receiving an insert elongated in the longitudinal direction with a close fit and closed at an opposite end, the insert having holes that extend in the longitudinal direction of the insert, said holes having openings only in a top surface of the insert adjacent said one end of the calibration block and being closed at an opposite end in the insert for receiving at least one temperature probe to be calibrated and for receiving at least one external temperature probe for controlling the distribution of heat in the block, said at least one external temperature probe extending through said opening in said top surface of the insert and downwardly into said closed hole, the block having several heat energy elements and external temperature probes that are connected to electric control circuits that regulate the supply of power to the heat energy elements, the calibration block being capable of receiving different inserts that are provided with a larger or smaller number of holes of varying size for receiving several sizes of temperature probes and optionally several temperature probes at a time, wherein at least two external temperature sensors are provided in at least two external temperature probes situated in holes in the calibration block, the sensors of the external temperature probes in the calibration block, as seen in the longitudinal direction, being situated at dissimilar distances from the openings of the holes of the insert and wherein at least two external temperature sensors are provided in one or more external temperature probes situated in the holes in the insert, the at least two sensors, as seen in the longitudinal direction, being situated at dissimilar distances from the openings of the holes of the insert, wherein at least two external temperature sensors in the insert and/or block are located in at least one external temperature probe, the at least two external sensors being located at a distance from each other in the longitudinal direction of the external temperature probe, and wherein a first regulator unit of the electric control circuits controls the basic energy supply to the calibration block by means of a first heat energy element extending in the longitudinal direction of the calibration block in response to a signal from one external temperature sensor provided in the calibration block, said one external sensor being in addition to said at least two external temperature sensors in the calibration block being situated at dissimilar distances from the openings of the holes of the insert, and wherein a second regulator unit of the electric control circuits controls a second heat energy element located in the calibration block at the one end of the calibration block where the opening for receiving the insert is located in response to signals from said at least two external temperature sensors in the calibration block and said at least two external temperature sensors in the insert.

2. The apparatus according to claim 1, wherein the at least two external temperature sensors in the insert are located in separate external temperature probes and the separate external temperature probes are located in separate holes in the insert.

3. The apparatus according to claim 1, wherein the heat energy elements are cooling elements.

4. The apparatus according to claim 1, wherein the electric control circuits comprise a digital storage for storing a correlation between temperature gradients in different places in the calibration block and in the insert in response to a given discharge and supply of power to the heat energy elements and the external temperature probes in the calibration block are configured for being offset-adjustable in response to information in the storage.

5. The apparatus according to claim 1, wherein the second regulator unit of the electric control circuits controls the second heat energy element in response to a difference in temperatures found by means of a first measurement unit on the basis of signals from said at least two external temperature sensors in the calibration block and in response to a difference in temperatures found by means of a second measurement unit on the basis of signals from said at least two external temperature sensors in the insert.

6. The apparatus according to claim 1, wherein the heat energy elements are electric heating elements.

7. The apparatus according to claim 6, wherein the heat energy elements are Peltier-elements.

8. The apparatus according to claim 1, wherein the at least two external temperature sensors in the insert are located in one single external temperature probe, the at least two external sensors being situated at a certain distance from each other in the longitudinal direction of the one single external temperature probe.

9. The apparatus according to claim 8, wherein the one single external temperature probe has two series-connected external temperature sensors that have a mutual spacing in the longitudinal direction of the one single external temperature probe and are connected to the electric control circuits for producing a control signal in response to the difference in temperature between the two external temperature sensors.

10. The apparatus according to claim 8, wherein three or more external temperature sensors are provided in the one single external temperature probe in the insert.

11. A calibration apparatus for calibrating temperature probes comprising a calibration block elongated in a longitudinal direction and having an opening at one end for receiving an insert elongated in the longitudinal direction with a close fit and closed at an opposite end, the insert having holes that extend in the longitudinal direction of the insert, said holes having openings only in a top surface of the insert adjacent said one end of the calibration block and being closed at an opposite end in the insert for receiving at least one temperature probe to be calibrated and for receiving at least one external temperature probe for controlling the distribution of heat in the block, said at least one external temperature probe extending through said opening in said top surface of the insert and downwardly into said closed hole, the block having several heat energy elements and external temperature probes that are connected to electric control circuits that regulate the supply of power to the heat energy elements, the calibration block being capable of receiving different inserts that are provided with a larger or smaller number of holes of varying size for receiving several sizes of temperature probes and optionally several temperature probes at a time, wherein at least two external temperature sensors are provided in at least two external temperature probes situated in holes in the calibration block, the sensors of the external temperature probes in the calibration block, as seen in the longitudinal direction, being situated at dissimilar distances from the openings of the holes of the insert and wherein at least two external temperature sensors are provided in one or more external temperature probes situated in the holes in the insert, the at least two sensors, as seen in the longitudinal direction, being situated at dissimilar distances from the openings of the holes of the insert wherein at least two external temperature sensors in the insert and/or block are locate in at least one external temperature probe, the at least two external sensors being located at a distance from each other in the longitudinal direction of the external temperature probe, and wherein a regulator unit of the electric control circuits controls a heat energy element located in the calibration block at the one end of the calibration block where the opening for receiving the insert is located in response to a difference in temperatures found by means of a first measurement unit on the basis of signals from said at least two external temperature sensors in the calibration block and in response to a difference in temperatures found by means of a second measurement unit on the basis of signals from said at least two external temperature sensors in the insert.

* * * * *

UNITED STATES PATENT AND TRADEMARK OFFICE
CERTIFICATE OF CORRECTION

PATENT NO. : 8,801,271 B2  
APPLICATION NO. : 12/258845  
DATED : August 12, 2014  
INVENTOR(S) : Harslund et al.

Page 1 of 1

It is certified that error appears in the above-identified patent and that said Letters Patent is hereby corrected as shown below:

On the Title page, item [57], line 5, "energy elements (-11)" should read --energy elements (9-11)--.

In the Claims

Claim 11, col. 6, line 27, "block are locate in" should read --block are located in--.

Signed and Sealed this  
Ninth Day of December, 2014

Michelle K. Lee  
*Deputy Director of the United States Patent and Trademark Office*